United States Patent
Taylor et al.

(10) Patent No.: US 10,825,006 B2
(45) Date of Patent: Nov. 3, 2020

(54) DEVICE-TO-DEVICE CLAIM STAKING

(71) Applicant: NCR Corporation, Duluth, GA (US)

(72) Inventors: Jed W. Taylor, South Jordan, UT (US);
Jonathan Gilson, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 571 days.

(21) Appl. No.: 14/575,500

(22) Filed: Dec. 18, 2014

(65) Prior Publication Data

US 2016/0180310 A1  Jun. 23, 2016

(51) Int. Cl.
| G06Q 20/18 | (2012.01) |
| G07F 19/00 | (2006.01) |
| G06Q 30/06 | (2012.01) |
| G06Q 30/02 | (2012.01) |
| G06Q 40/00 | (2012.01) |
| G06Q 20/10 | (2012.01) |
| G06Q 20/20 | (2012.01) |

(52) U.S. Cl.
CPC ......... *G06Q 20/18* (2013.01); *G06Q 20/1085* (2013.01); *G06Q 20/202* (2013.01); *G06Q 30/02* (2013.01); *G06Q 30/06* (2013.01); *G06Q 40/00* (2013.01); *G07F 19/20* (2013.01); *G07F 19/201* (2013.01)

(58) Field of Classification Search
None
See application file for complete search history.

(56) References Cited

U.S. PATENT DOCUMENTS

| 6,408,279 | B1* | 6/2002 | Mason | A47F 9/047 235/383 |
| 6,571,218 | B1* | 5/2003 | Sadler | G06Q 20/20 235/462.01 |
| 6,694,234 | B2* | 2/2004 | Lockwood | G06Q 10/20 701/31.5 |
| 7,322,516 | B2 | 1/2008 | Savage et al. | |
| 7,464,860 | B2 | 12/2008 | Militello et al. | |
| 8,069,368 | B2* | 11/2011 | Hatasaki | G06F 11/2028 714/13 |
| 8,423,414 | B2* | 4/2013 | De Araujo | G06Q 20/20 705/16 |
| 8,651,373 | B1 | 2/2014 | Block et al. | |
| 8,943,180 | B1* | 1/2015 | Petit-Huguenin | H04L 67/16 709/223 |
| 2001/0044751 | A1* | 11/2001 | Pugliese, III | G06Q 30/02 705/14.1 |
| 2003/0065568 | A1* | 4/2003 | Kondo | G06Q 20/207 705/19 |

(Continued)

OTHER PUBLICATIONS

"Opera PMS Reference Manual Opera Hotel Edition Version 4.0",Micros, 2006.*

(Continued)

*Primary Examiner* — Allen C Chein
(74) *Attorney, Agent, or Firm* — Schwegman, Lundberg & Woessner (57) ABSTRACT

A first resource is used for initiating a transaction on a first channel. A second resource of a second channel is identified to assist in a portion of the transaction. The second resource is claimed for the transaction and the portion of the transaction is routed to the second resource on the second channel for processing.

12 Claims, 6 Drawing Sheets

(56) References Cited

U.S. PATENT DOCUMENTS

| | | | | |
|---|---|---|---|---|
| 2005/0033843 A1* | 2/2005 | Shahi | ............... | G06F 17/30899 |
| | | | | 709/226 |
| 2006/0180654 A1 | 8/2006 | Meek et al. | | |
| 2010/0280878 A1* | 11/2010 | Wilson | ................... | G06Q 20/20 |
| | | | | 705/16 |
| 2012/0203605 A1* | 8/2012 | Morgan | ............. | G06Q 20/3276 |
| | | | | 705/14.17 |
| 2014/0351623 A1* | 11/2014 | Baird | ................ | G06F 11/1484 |
| | | | | 714/4.11 |
| 2016/0260068 A1* | 9/2016 | Dent | ................... | G06Q 20/327 |

OTHER PUBLICATIONS

European Search Report issued in copending European patent application No. EP15191240.9, dated Jan. 5, 2016.

* cited by examiner

DEVICE-TO-DEVICE CLAIM STAKING

BACKGROUND

Consumers are embracing technology at increasing rates and are demanding improved customer service from enterprises in assisting with their needs and their usages of that technology.

Enterprises that fall behind quickly lose customer loyalty and business. Consequently, every enterprise is trying to offer the latest technology to their customers, learn about each customer individually, and service each customer efficiently while holding down expenses. This is a challenging task for even the largest of enterprises.

One issue for customers of an enterprise is the inability to complete a transaction once started at a Self-Service Terminal (SST) or the transaction being unable to complete because of a condition at the SST where the customer is engaged in the transaction. In most cases, the only option for the customer is start over at a different SST to complete the transaction but this may not even be a viable option when the transaction has progressed to a point that it appears to be completed to the SST.

One issue for owners or operators of an enterprise, particularly a bank branch, is that there is only a minimal interface between teller software that is used for teller transactions and other software used for other terminals in the branch, such as SSTs (including Automated Teller Machines (ATMs)). This limits teller staff visibility to such terminal transactions.

Therefore, it is desirable to provide an improved experience for customers during a transaction with an enterprise and improved manageability of such transactions by enterprise staff.

SUMMARY

In various embodiments, methods and apparatus for providing integrated devices within an enterprise are provided. In some embodiments, a Self-Service Terminal (SST) for providing device-to-device claim staking is presented.

According to an embodiment, a method for providing resource-to-resource claim staking is presented. Specifically, a transaction is monitored on a first channel. Next, a resource of a second channel is claimed for processing at least a portion of the transaction where the first channel and the second channel are different channels from one another.

According to another embodiment, there is provided an enterprise application providing a member of enterprise staff with a view of transactions occurring on a plurality of terminals in the enterprise including at least one customer operated terminal and one staff operated terminal.

By providing a single enterprise application that communicates seamlessly with a customer operated terminal and a staff operated terminal within an enterprise, a staff member is provided with a view of transaction information entered at, and provided to, each terminal, and these terminals can access the same services via the single enterprise application, thereby avoiding the need to duplicate services.

DETAILED DESCRIPTION

Figure 1:
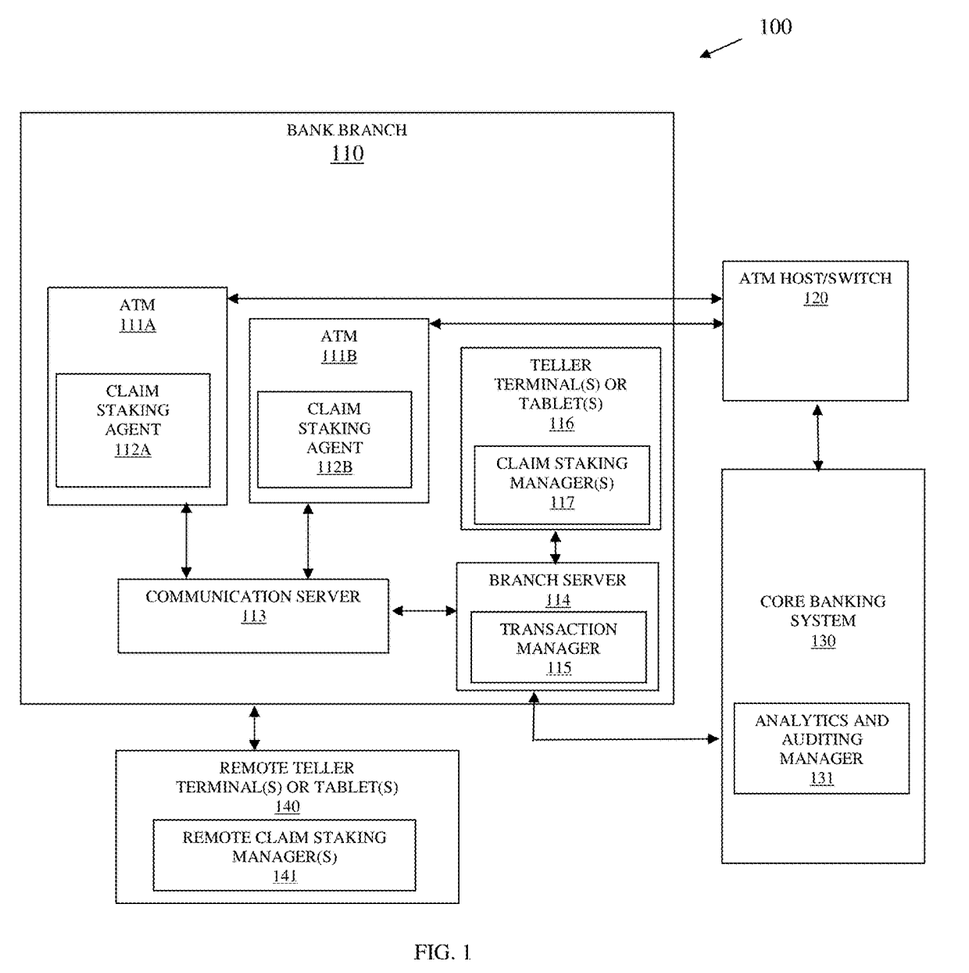
FIG. 1 is a diagram of a banking retail system providing device-to-device teller assistance to a customer during a transaction by the customer at an Automated Teller Machine (ATM), according to an example embodiment.

FIG. 1 is a diagram of a banking retail system 100 providing device-to-device teller assistance to a customer during a transaction by the customer at an Automated Teller Machine (ATM), according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of device-to-device claim staking, presented herein and below.

The banking retail system 100 includes a bank branch 110, an ATM host/switch 120, a core banking system 130, and one or more remote teller terminals or tablets 140 (each having a remote claim staking manager 141). The bank branch 110 includes ATM 111A (having a claim staking agent 112A), ATM 111B (having claim staking agent 112B), a communication server 113, a branch server 114 (having a transaction manager 115), and one or more teller terminals or tablets 116 (each having a claim staking manager 117). The core banking system 130 includes an analytics and auditing manager 131.

During operation, a customer operates the ATM 111A to conduct a transaction. That transaction is monitored at the branch server 114 through the transaction manager 115. This provides details relevant to the transaction to the teller terminals or tablets 116 or 140 through communication between the transaction manager 115 and the claim staking manager 117 or 141. The transaction details are accessible to a teller operating the terminals or tablets 116 or 140 in real time or near real time. Additionally, any financial transaction to deposit or receive cash from the ATM 111A and ATM 111B makes a network connection with a remote ATM host/switch 120 that routes that transaction and the corresponding transaction details along with approval or denial through the core banking system 130.

An interface on the ATM 111A (which the customer in the example is engaged in a transaction with) may also include a variety of interfaces options on one or more screens of a display associated with the ATM 111A, such that the customer may select assistance either from a local teller operating a teller terminal or tablet 116 within the bank branch 110 or from a remote teller operating teller terminals or tablets 140, which are geographically remote from and external to the bank branch 110.

Additionally, the customer may not have to request assistance with the transaction but real-time or near real-time monitoring by either a local or remote teller (operating terminals or tablets 116 and 140) may indicate to the teller that the customer needs assistance in some manner. For example, ATM 111A may send a status or error message indicating: that it is out of paper necessary to print a receipt, that a currency dispenser did not dispense cash associated with a transaction, that the screen display is malfunctioning, that the receipt printer is jammed, and the like. As another example, branch rules at the branch server 114 may indicate that the customer is attempting a transaction that requires additional validation by the teller (such as withdrawal of cash in excess of a certain limit requiring teller validation of the customer's identity before permitting such a transaction to proceed).

When it is determined that the customer is in need of some assistance (either specifically requested by the customer through an interface at ATM 111A or detected by events and/or evaluation of branch rules), a local or remote teller can take action to assist using the teller terminal or tablet 116 or 140.

If the assistance can be resolved for the customer through an override by the teller, which is made to the branch server 114 and communicated to the core banking system 130, then the teller performs such an override for the transaction to complete the transaction at ATM 111A on behalf of the customer.

However, if the assistance indicates that the customer can no longer finish the transaction at the current ATM 111A, then the teller activates the claim staking manager 117 (local teller) or 141 (remote teller) to claim stake to an available ATM 111B through its claim staking agent 112B or 141. The actions taking place with the transaction (claiming or enlisting a different ATM 111B to complete a portion or assist in a portion of the customer transaction initiated on ATM 111A) are routed through the communication server 113 to the transaction manager 115 of the branch server 114. Moreover, information relevant to and associated with the claim staking and the transaction are routed from the branch server 114 to the analytics and auditing manager 131 of the core banking system 130.

In an embodiment, the transaction manager 115 maintains a listing of available ATMs and peripheral devices associated with the available ATMs. A peripheral device can include: a receipt printer, a display, a valuable-media dispenser, a camera, a scanner, an encrypted pin pad, a touch screen display, a magnetic strip reader, and the like. The transaction manager 115 when notified by the teller through the claim staking manager 117 or 141 may be asked to identify ATM 111B as having the resources (peripheral devices) or the supplies (currency, ink, paper, etc.) necessary to successfully conclude the transaction for the customer. It may also be that the teller, via an interface on the terminal/tablet 116 or 140, actively requests use of ATM 111B for completing the transaction for the customer, such request routed to the transaction manager 115.

The transaction manager 115 communicates with the claim staking agent 112B of ATM 111B through communication server 113 and instructs claim staking agent 112B to give control to the teller, via the claim staking manager 117 or 141. The teller using an interface on the terminal or tablet 116 or 140 to interact with the claim staking manager 117 or 141. Communication from claim staking manager 117 or 141 is routed through and evaluated for branch rule compliance by the transaction manager 115.

Using the interface on the terminal or tablet 116 or 140, the teller now has control and has claim staked ATM 111B to complete or assist in the customer's transaction that was initiated on ATM 111A. Details relevant to the transaction and the switching from ATM 111A to ATM 111B are provided through the branch server 114 to the analytics and auditing manager 131. In this way, the proper auditing trail, usage, and balancing of all the ATMs in the bank branch 110 can be maintained for compliance, support, and maintenance purposes at the core banking system 130.

Once the teller claim stakes ATM 111B, the teller then issues one or more commands through the interface to conclude the transaction with the customer. If the teller is a local teller, the teller may physically approach the customer and inform the customer to follow the teller to ATM 111B to complete the transaction. If the teller is a remote teller, the teller may message or video chat with the customer to instruct the customer to move to ATM 111B to complete the transaction. It is noted that a local teller may also message or video chat as well to instruct the customer to move to ATM 111B for the transaction.

The commands may be directed to peripherals of ATM 111B that instruct the peripheral to perform some action, such as printing, displaying, dispensing, and the like. When the peripheral requires credentialing information, such credentialing information can be supplied from the transaction manager to the claim staking agent 112B so that the teller is never capable of seeing or even having the credentialing information on the teller's terminal or tablet 116 or 140.

In this way, a teller using the teller's terminal or tablet 116 or 140 is able to locally (within the bank branch 110) or externally (geographically remote location from the bank branch 110) claim stake an ATM 111B to assist in and/or complete a transaction of a customer that was initiated on a different and originating ATM 111A.

It is also noted that during a transaction for a customer, the teller may use multiple peripherals associated with multiple ATMs. It may also be that ATM 111B is needed for just a portion of the transaction such that once that portion is completed the teller can claim stake ATM 111A again to conclude the transaction.

In an embodiment, the teller uses the terminal or tablet 116 or 140 to claim stake a peripheral not associated with a particular ATM, such as branch-accessible network printer. Again, such an embodiment is achieved through the claim staking manager 117 or 141 and routed through the transaction manager 115 of the branch server 114.

In an embodiment, the transaction that the customer engages in may require a remote expert (loan officer) where ATM 111A is not equipped to handle but ATM 111B is equipped to handle through remote audio, video, and/or text communications with that remote expert. The customer can be instructed to move to ATM 111B where the remote expert is connected to assist in a communication session with all the information already provided by the customer for engaging in that transaction available to the expert (that information already provided by the customer on ATM 111A).

In an embodiment, when the customer is connected with the remote teller, the resulting communication session can be: audio-based, audio and video based, text based, avatar based, or a combination of these things.

In an embodiment, the customer initiates a transaction in person with a local teller and provides some details relevant to the transaction that the teller enters on behalf of the customer using an interface of the terminal or tablet 116 and the teller claim stakes ATM 111A or ATM 111B for the customer to go to and complete the transaction.

Some of embodiments of the FIG. 1 and other embodiments are now discussed with reference to the FIGS. 2-4.

Figure 2:
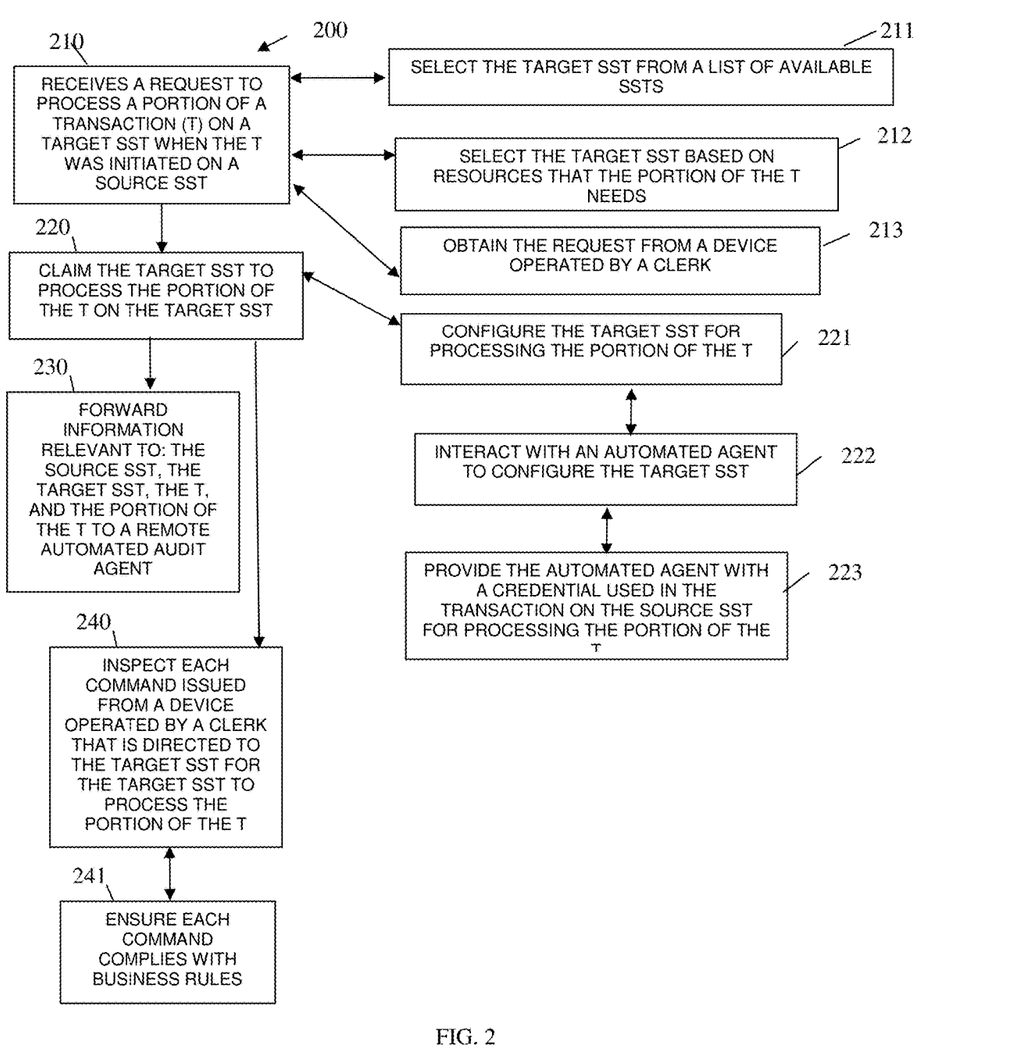
FIG. 2 is a diagram of a method for providing device-to-device claim staking assistance to a customer during a transaction, according to an example embodiment.

FIG. 2 is a diagram of a method 200 for providing device-to-device claim staking assistance to a customer during a transaction, according to an example embodiment. The software module(s) that implements the method 200 is referred to as a "local device claim-staking manager." The local device claim-staking manager is implemented as executable instructions programmed and residing within memory and/or a non-transitory computer-readable (processor-readable) storage medium and executed by one or more processors of a device. The processor(s) of the device that executes the local device claim-staking manager are specifically configured and programmed to process the local device claim-staking manager. The local device claim-staking manager has access to one or more network connections during its processing. The network connections can be wired, wireless, or a combination of wired and wireless.

In an embodiment, the device that executes the local device claim-staking manager interface is the branch server 114 of the FIG. 1.

In an embodiment, the device that executes the local device claim-staking manager is a Local-Area Network (LAN) server.

In an embodiment, the device that executes the local device claim-staking manager is a Wide-Area Network (WAN) server.

In an embodiment, the local device claim-staking manager is the transaction manager 115 of the FIG. 1.

At 210, the local device claim-staking manager receives a request to process a portion of a transaction on a target SST when the transaction was initiated on a source SST. That is a customer originates a transaction by operating or interacting with a source SST and the local device claim-staking manager receives a request to process some portion of that transaction on a different target SST.

The local device claim-staking manager acts as a proxy between the target SST and the device that makes the request, which is different from the source SST.

According to an embodiment, at 211, the local device claim-staking manager selects the target SST from a list of available SSTs. Here, the local device claim-staking manager controls which of an available list of SSTs will process the portion of the transaction by selecting the target SST when a request is received.

In an embodiment, at 212, the local device claim-staking manager selects the target SST based on resources that the portion of the transaction needs. So, the portion of the transaction may require a specific peripheral device that is either unavailable or malfunctioning on the source SST and the local device claim-staking manager maintains a list of resources along with status information for those resources for each available SST and selects the target resource based on what the resource needs of the portion of the transaction that has to be processed.

In an embodiment, at 213, the local device claim-staking manager obtains the request from a device operated by clerk. In an embodiment, the device is the terminal or tablet 116 or the terminal or tablet 140 of the FIG. 1. In an embodiment, the device is a mobile device that is one of: a tablet, a laptop, a phone, and a wearable processing device. In an embodiment, the device is a Point-Of-Sale (POS) terminal.

At 220, the local device claim-staking manager claims the target SST to process the portion of the transaction on the target SST. That is the local device claim-staking manager reserves or takes at least partial operating control of the target SST for purposes of processing the portion of the transaction.

According to an embodiment, at 221, the local device claim-staking manager configures the target SST for processing the portion of the transaction. This can be done by adjusting settings, providing information, initiating processes, and the like on the target SST.

In an embodiment of 221 and at 222, the local device claim-staking manager interacts with an automated agent to configure the target SST. In an embodiment, the automated agent is the claim staking agent 112A or the claim staking agent 112B of the FIG. 1.

In an embodiment of 222 and at 223, the local device claim-staking manager provides the automated agent with a credential used in the transaction on the source SST for processing the portion of the transaction. For example, the credential may include an encrypted key or hash value linked to a customer that originated the transaction and/or the transaction. The credential initially provided by the customer on the source SST and is not resupplied by the customer on the target SST; rather, the local device claim-staking manager supplies the credential.

According to an embodiment, at 230, the local device claim-staking manager forwards information that is relevant to: the source SST (such as source SST identifier), the target SST (such as target SST identifier), the transaction (such as transaction and/or session identifiers), and the portion of the transaction (such as operation identifiers or command identifiers). The information is forwarded by the local device claim-staking manager to a remote automated agent. In an embodiment, the remote automated agent is the analytics and auditing manager 131 of the FIG. 1.

In an embodiment, at 240, the local device claim-staking manager inspects each command issued from a device operated by a clerk that is directed to the target SST for the target SST to process the portion of the transaction.

According to an embodiment of 240 and at 241, the local device claim-staking manager ensures each command complies with business rules.

Figure 3:
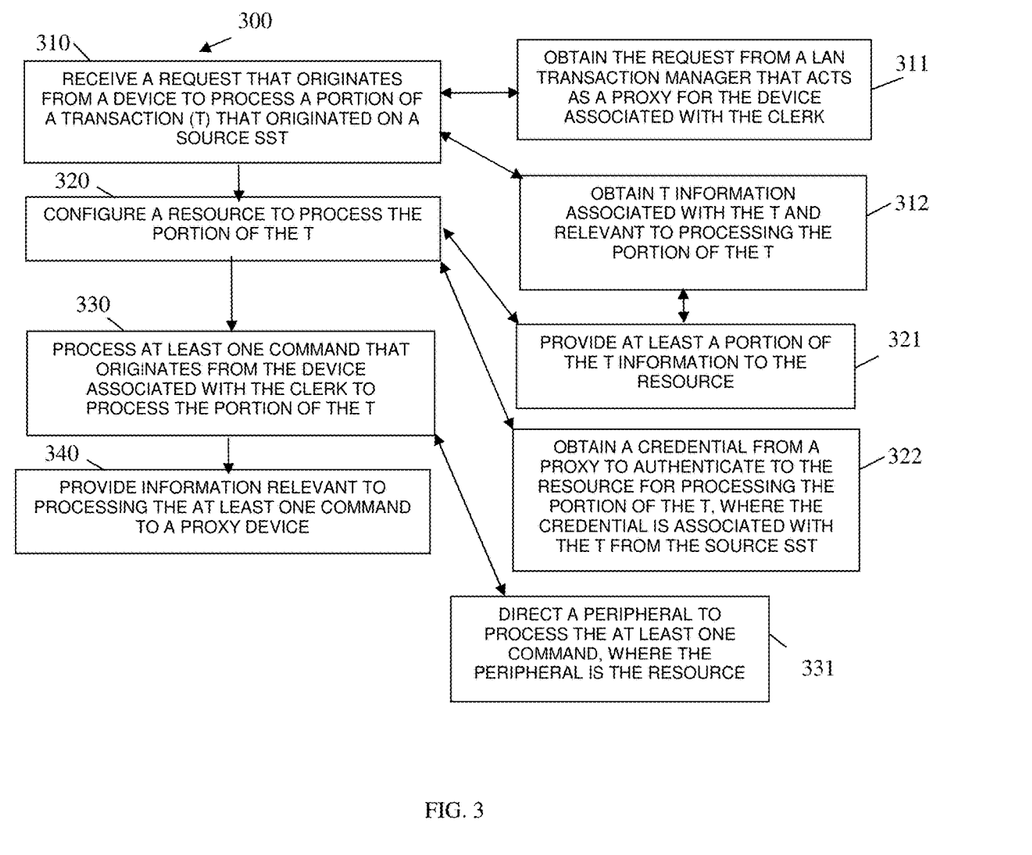
FIG. 3 is a diagram of another method for providing device-to-device claim staking assistance to a customer during a transaction, according to an example embodiment.

FIG. 3 is a diagram of another method 300 for providing device-to-device claim staking assistance to a customer during a transaction, according to an example embodiment. The software module(s) that implements the method 300 is referred to as a "claim staking device agent." The claim staking device agent is implemented as executable instructions programmed and residing within memory and/or a non-transitory computer-readable (processor-readable) storage medium and executed by one or more processors of a device. The processors that execute the claim staking device agent are specifically configured and programmed to process the claim staking device agent. The claim staking device agent has access to one or more network connections during its processing. The network connections can be wired, wireless, or a combination of wired and wireless.

In an embodiment, the device that executes the claim staking device agent is ATM 111A or ATM 111B of the FIG. 1.

In an embodiment, the device that executes the claim staking device agent is a Self-Service Terminal (SST).

In an embodiment, the device that executes the claim staking device agent is kiosk.

In an embodiment, the claim staking device agent is the claim staking agent 112A or the claim staking agent 112B of the FIG. 1.

The claim staking device agent interacts (directly or indirectly) with the local device claim staking manager manager of the FIG. 2 to assist in conducting a customer's transaction at multiple SSTs.

At 310, the claim staking device agent receives a request from a device associated to a clerk to process a portion of a transaction that originated on a source SST.

According to an embodiment, at 311, the claim staking device agent obtains the request from a Local-Area Network (LAN) transaction manager that acts as a proxy for the device associated with the clerk. In an embodiment, the transaction manager is the transaction manager 115 of the FIG. 1. In an embodiment, the transaction manager is the method 200 of the FIG. 2.

In an embodiment, the claim staking device agent obtains the request from a WAN transaction manager that acts as a proxy for the device associated with the clerk.

In an embodiment, at 312, the claim staking device agent obtains transaction information associated with the transaction and relevant to processing the portion of the transaction.

At 320, the claim staking device agent configures a resource to process the portion of the transaction.

In an embodiment of 312 and 320, at 321, the claim staking device agent provides at least a portion of the transaction information to the resource for purposes of performing the configuration.

According to an embodiment, at 322, the claim staking device agent obtains a credential from a proxy to authenticate to the resource for processing the portion of the transaction. The credential associated with the transaction from the source SST. In an embodiment, the proxy is the transaction manager 115 of the FIG. 1. In an embodiment, the proxy is the method 200 of the FIG. 2.

At 330, the claim staking device agent processes at least one command that originates from the device associated with the clerk to process the portion of the transaction.

According to an embodiment, at 331, the claim staking device agent directs a peripheral to process the command. The peripheral is the resource that was configured at 320.

In an embodiment, at 340, the claim staking device agent provides information relevant to processing the command to a proxy device. In an embodiment, the proxy device is the branch server 114. In an embodiment, the proxy device is the device that executes the method 200 of the FIG. 2.

Figure 4:
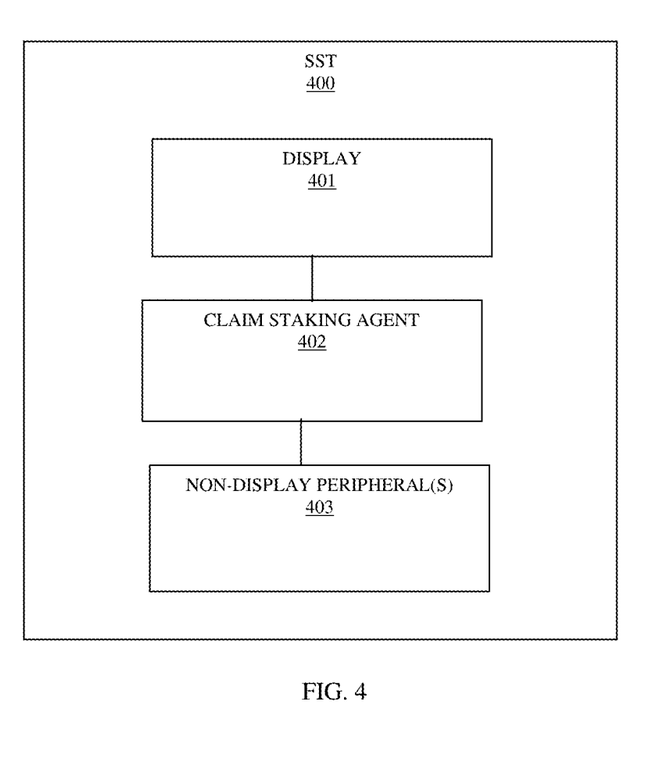
FIG. 4 is a diagram of a Self-Service Terminal, according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 communicates over one or more networks, which can be wired, wireless, or a combination of wired and wireless.

In an embodiment, the SST 400 is the ATM 111A or the ATM 111B of the FIG. 1.

In an embodiment, the SST 400 is a kiosk.

The SST 400 includes a display 401 and a claim staking agent 402. In an embodiment, the SST 400 includes at least one non-display peripheral 403.

In an embodiment, the display 401 is a touchscreen.

The claim staking agent 402 is adapted and configured to: execute on the SST 400, configure a resource of the SST 400 to process a portion of a transaction that originated on a source SST, and process at least one command that originates from a controlling device to process the portion.

In an embodiment, the claim staking agent 402 is the claim staking agent 112A or the claim staking agent 112B of the FIG. 1.

In an embodiment, the claim staking agent 402 is the method 300 of the FIG. 3.

According to an embodiment, the claim staking agent 402 is further adapted and configured to provide audit data to a proxy relevant to the at least one command. In an embodiment, the proxy is the transaction manager 115 of the FIG. 1. In an embodiment, the proxy is the method 100 of the FIG. 1.

In an embodiment, the SST 400 also includes at least one non-display peripheral 403. The non-display peripheral 403 is the resource that is configured. In an embodiment, the resource processes at least one command.

In an embodiment, the non-display peripheral 403 is one of: a valuable-media dispenser, another scanner, a printer, an encrypted pin pad, a pin pad, a keyboard, and a storage device.

Figure 5:
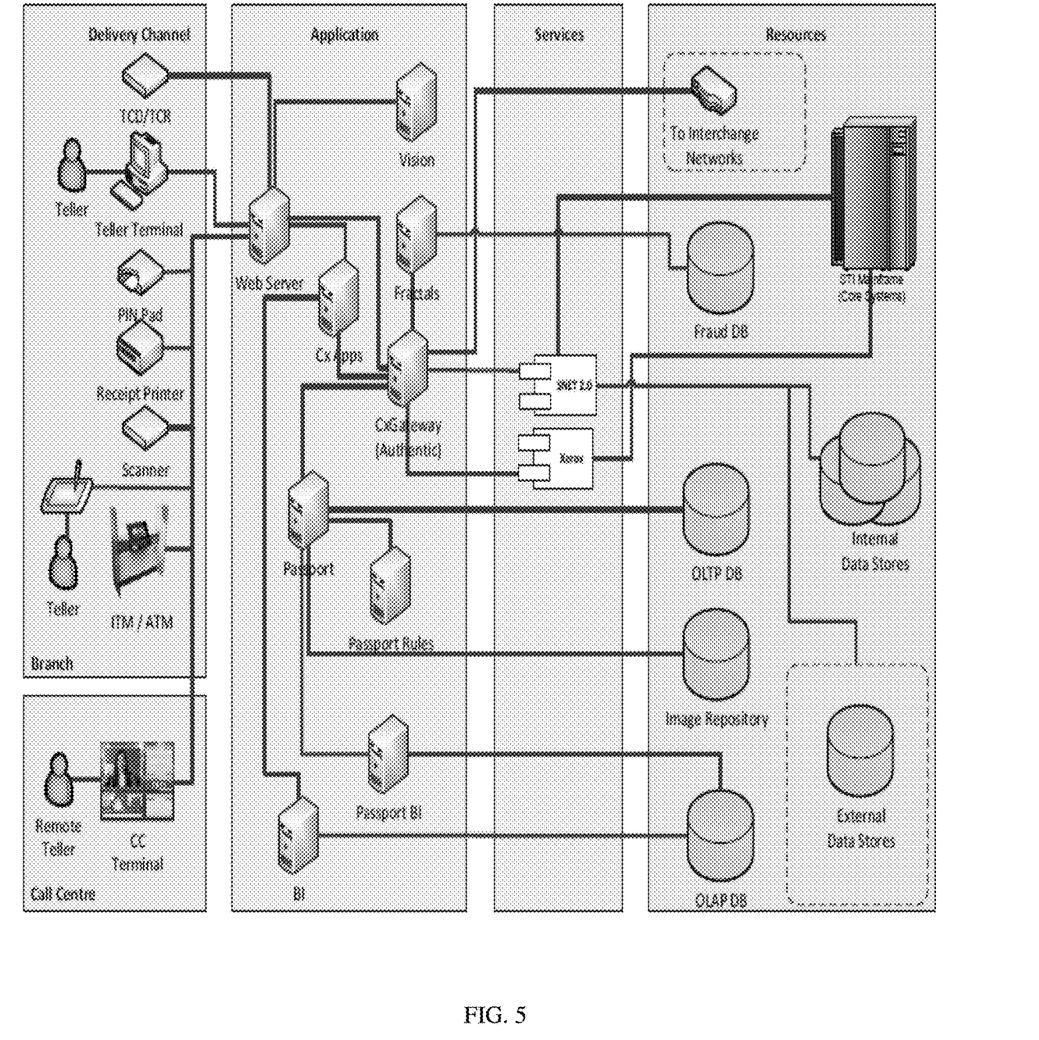
FIG. 5 is a diagram of an example architecture, according to an example embodiment.

FIG. 5 is a diagram of an example architecture, according to an example embodiment. The architecture is shown in greatly simplified form with just elements necessary to understanding of resource-to-resource claim staking being illustrated.

A "resource" can be hardware, such as discussed above with reference to SSTs, peripheral devices, tablets, terminals, and the like. A resource can also be software-based such as applications that are processed on a hardware resource.

The architecture shows a variety of delivery channels from which a teller or clerk has access to via a hardware resource, such as a teller terminal, a tablet, a PIN pad, a receipt printer, an ATM, a remote teller using a remote device or set of device. These channels feed into a web server, which then provides access to a variety of other servers having a variety of different software-based resources and data. Gateways and switches provide access to even more hardware resources such as backend databases. The software resources or applications may also be referred to herein as services.

The teller has access from a teller device (terminal or tablet) to a teller application that is enabled to visualize transactions or actions occurring on all the channels or channels for which the teller application is configured to have access to.

The teller application is able to switch activity or transactions from one channel to another channel by resource-to-resource claim staking in the manners similar to what was discussed above with the description of the FIGS. 1-4.

For example, a teller can operate an interface associated with the teller application to identify a transaction on one channel and move it to a resource (claim-staked) of an entirely different channel. This gives the teller complete control over utilizing both hardware and software resources for transactions occurring within a bank branch or a retail establishment when the teller is a clerk. The teller application unifies all the hardware and software resources within a bank branch or a retail facility. It also permits the teller, via the teller application, to utilize offsite or remote network resources for any given transaction.

It is also noted that as used with the discussion of the FIGS. 5 and 6 below, a "transaction" is not limited to a customer initiated transaction at an SST; rather, it can be any action being taken and visible, through the teller application for which the teller can intervene and claim stake a different resource, perhaps, on an entirely different channel to assist in that action.

The point is that the teller application processing on a teller terminal or tablet provides an interface for a teller or clerk at a branch or a facility to visualize transactions as to where the transactions are initiated, what resources (hardware or software) the transactions need, and what resources (hardware or software) are available to assist in those transactions. This is a channel integration approach because transactions can span multiple communication channels and use resources associated with each of those channels. The interface of the teller application provides the monitoring, control, and resource claim staking to route transactions through to efficient completion.

Typically, in a bank branch ATM applications are independent of bank branch applications and the two sets of applications occur over different channels providing minimal visibility and control to the teller. There is also very little interaction between the ATM applications and the bank branch applications. The teller application unifies the two sets of applications into a unified view and can work between communication channels to efficiently assist in transactions regardless of the channels that the transactions originate on.

Figure 6:
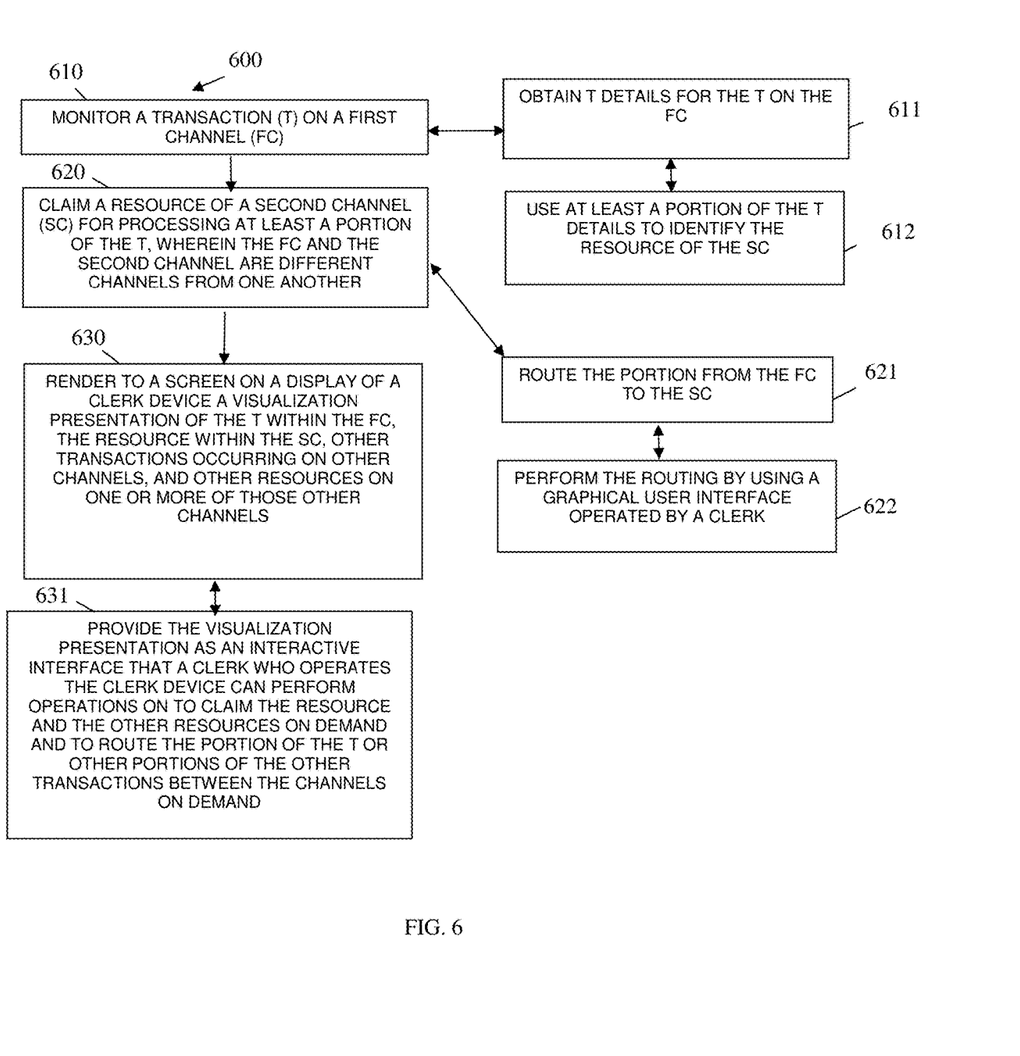
FIG. 6 is a diagram of a method for channel integration associated with resource-to-resource claim staking, according to an example embodiment.

FIG. 6 is a diagram of a method 600 for channel integration associated with resource-to-resource claim staking, according to an example embodiment. The software module(s) that implements the method 600 is referred to as a "channel integration resource claim-staking manager." The channel integration resource claim-staking manager is implemented as executable instructions programmed and residing within memory and/or a non-transitory computer-readable (processor-readable) storage medium and executed by one or more processors of a device. The processor(s) of the device that executes the channel integration resource claim-staking manager are specifically configured and programmed to process the channel integration resource claim-staking manager. The channel integration resource claim-staking manager has access to one or more network connections during its processing. The network connections can be wired, wireless, or a combination of wired and wireless.

In an embodiment, the channel integration resource claim-staking manager is an enhanced version of the claim staking manager 117 of the FIG. 1.

In an embodiment, the channel integration resource claim-staking manager is an enhanced version of the method 200.

At 610, the channel integration resource claim-staking manager monitors a transaction on a first channel.

A "channel" is a distinct communication line, network session, or medium for which one or more hardware and/or software resources are available.

According to an embodiment, at 611, the channel integration resource claim-staking obtains transaction details for the transaction on the first channel. This may be automatically provided or acquired on demand. The transaction details can include a variety of information, such as and by way of example only, resource being used on the first channel, next resource needed on the first channel for the transaction, processing load or memory utilization for each of the resources on the first channel, user or customer identifier associated with the transaction, transaction type, date and time the transaction was initiated, any time the transaction has been idle awaiting a resource, any status indicating if override authority is needed for the transaction to continue, and the like.

In an embodiment of 611 and at 612, the channel integration resource claim-staking uses at least a portion of the transaction details to identify the resource of the second channel (discussed below at 620).

At 620, the channel integration resource claim-staking claims a resource of a second channel for processing at least a portion of the transaction.

In an embodiment, the first channel and the second channel are different channels from one another. In an embodiment, the first and second channels are different types of communication channels In an embodiment, the first and second channels are a same channel or same type of channel.

In an embodiment, at 621, the channel integration resource claim-staking routes the portion from the first channel to the second channel for processing.

In an embodiment of 621 and at 622, the channel integration resource claim-staking performs the routing by using a graphical user interface that a clerk or an operator interacts with.

According to an embodiment, at 630, the channel integration resource claim-staking renders to a screen on a display of a clerk device a visualization presentation of the transaction within the first channel, the resource within the second channel, other transactions occurring on other channels, and other resources on one or more of the other channels.

In an embodiment of 630 and at 631, the channel integration resource claim-staking provides the visualization presentation as an interactive interface that a clerk who operates the clerk device can perform operations on to claim the resource and the other resources on demand and to route the portion of the transaction or other portions of the other transactions between the channels on demand.

The channel integration resource claim-staking gives an operator of the device that executes the channel integration resource claim-staking a unified view of transactions (actions) within a facility and permits intervention to claim stake resources (hardware and/or software) to facilitate the efficient processing of portions of those transactions.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving a request to process a portion of a transaction on a target Self-Service Terminal (SST) when the transaction was initiated and being processed on a source SST and encountered a problem with a source peripheral device for which the transaction could not finish processing the transaction on source peripheral device of the source SST, wherein receiving further includes obtaining the request from a server that routed the request from the source SST upon identification that the source peripheral device was unable to perform a peripheral operation to finish the transaction, wherein receiving further includes identifying the source peripheral device as: a receipt printer of the source SST, a display of the source SST, a valuable media-dispenser of the source SST, a camera of the source SST, a scanner of the source SST, an encrypted Personal Identification Number (PIN) pad of the source SST, a touch screen display of the source SST, or a magnetic strip reader of the source SST, wherein receiving further includes receiving the request from the server that monitored the transaction on the source SST and that selected the target SST for receiving the request based on a list of available target SSTs and available target peripherals of the available target SSTs;

sending a notification to a customer associated with the transaction to proceed to the target SST to complete the transaction; and claiming the target SST to process the portion of the transaction on the target SST by reserving and taking at least partial operating control over of a peripheral device of the target SST, wherein the peripheral device corresponding to the source peripheral device on the target SST, and wherein claiming further includes directing the peripheral device to process the portion, and processing, by the peripheral device, the portion on the peripheral device to complete the transaction and performing the peripheral operation on the peripheral device of the target SST that the source peripheral device was unable to process based on processing the portion by the peripheral device of the target SST, wherein the source SST and the target SST are self-operated by the customer.

2. The method of claim 1, wherein receiving further includes selecting the target SST based on resources that the portion of the transaction needs.

3. The method of claim 1, wherein receiving further includes obtaining the request from a device operated by a clerk.

4. The method of claim 1, wherein claiming further includes configuring the target SST for processing the portion of the transaction.

5. The method of claim 4, wherein configuring further includes interacting with an automated agent to configure the target SST.

6. The method of claim 5, wherein interacting further includes providing the automated agent with a credential used in the transaction on the source SST for processing the portion of the transaction.

7. The method of claim 1 further comprising, forwarding information relevant to: the source SST, the target SST, the transaction, and the portion of the transaction to a remote automated audit agent.

8. The method of claim 1 further comprising, inspecting each command issued from a device operated by a clerk that is directed to the target SST for the target SST to process the portion of the transaction.

9. The method of claim 8, wherein inspecting further includes ensuring each command complies with business rules.

10. A Self-Service Terminal (SST), comprising:
a display; and
a claim staking agent configured and adapted to:
i) execute on the SST,
ii) configure a resource of the SST to process a portion of a transaction that originated on a source SST,
wherein the resource is a peripheral device of the SST,
wherein the portion was originally unable to be processed by an identified source peripheral device of the source SST,
wherein a notification is sent to a customer associated with the transaction to proceed to the SST to complete the transaction from the source SST to the SST, wherein both the source SST and the SST are self-operated by the customer,
wherein the SST is different from the source SST,
and wherein the portion of the transaction is received from a server that monitored the transaction on the source SST and selected the SST for receiving the portion based on a list of available target SSTs and available target peripherals of the available target SSTs,
and iii) reserve and take at least partial operating control of the resource and process at least one command by and on the resource corresponding to the portion to continue processing and complete the transaction by performing a peripheral operation on the SST,
wherein the resource corresponds to the source peripheral device, and
wherein the resource is: a receipt printer of the SST, the display of the SST, a valuable media-dispenser of the SST, a camera of the SST, a scanner of the SST, an encrypted Personal Identification Number (PIN) pad of the SST, a touch screen display of the SST, or a magnetic strip reader of the SST.

11. The SST of claim 9, wherein the claim staking agent is further configured and adapted to iv) provide audit data to a proxy relevant to the at least one command.

12. The SST of claim 9 further comprising, at least one non-display peripheral device, wherein the at least one non-display peripheral device is the resource.

* * * * *